United States Patent
Arisato et al.

(10) Patent No.: US 8,305,334 B2
(45) Date of Patent: Nov. 6, 2012

(54) LIQUID CRYSTAL DISPLAY DEVICE

(75) Inventors: Kozo Arisato, Ichihara (JP); Masaki Ichio, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 872 days.

(21) Appl. No.: 12/369,033

(22) Filed: Feb. 11, 2009

(65) Prior Publication Data

US 2009/0207126 A1 Aug. 20, 2009

(30) Foreign Application Priority Data

Feb. 14, 2008 (JP) ................................. 2008-032670

(51) Int. Cl.
*G09G 3/36* (2006.01)
(52) U.S. Cl. .......................................... 345/102; 345/87
(58) Field of Classification Search .................. None
See application file for complete search history.

(56) References Cited

U.S. PATENT DOCUMENTS

| 7,234,945 | B2 * | 6/2007 | Azuma et al. .................. 439/67 |
| 2007/0070263 | A1 | 3/2007 | Nishimura et al. |
| 2008/0129916 | A1 * | 6/2008 | Ota et al. ........................ 349/58 |
| 2010/0002168 | A1 * | 1/2010 | Sato ................................ 349/58 |

FOREIGN PATENT DOCUMENTS

| CN | 1598658 | 3/2005 |
| CN | 1940653 | 4/2007 |
| JP | 06-160878 | 6/1994 |

* cited by examiner

*Primary Examiner* — Paul Huber
(74) *Attorney, Agent, or Firm* — Antonelli, Terry, Stout & Kraus, LLP.

(57) ABSTRACT

The invention provides a liquid crystal display device which can reduce the manufacturing cost by reducing the number of parts and simplifying the fabrication and the assembling operation, for the conduction between a metal frame and a color filter substrate. A liquid crystal display panel has a conductive layer on a front surface of a second glass substrate. A panel frame has a side wall part extending along a side wall of the liquid crystal display panel and an upper surface part extending from the side wall part toward a front surface direction of the liquid crystal display panel, integrally formed together. The upper surface part is in contact with the conductive layer of the liquid crystal display panel. A constant potential is applied to the panel frame.

8 Claims, 4 Drawing Sheets

LIQUID CRYSTAL DISPLAY DEVICE

CROSS-REFERENCE TO RELATED APPLICATION

The present application claims priority from Japanese application JP2008-32670 filed on Feb. 14, 2008, the content of which is hereby incorporated by reference into this application.

BACKGROUND OF THE INVENTION

1. Field of the Invention

The present invention relates to a liquid crystal display device, particularly, to a liquid crystal display device of a horizontal electric field type so-called IPS (In-Plane Switching) type, and more specifically to an antistatic structure for a liquid crystal display panel housed in a panel frame.

2. Description of Related Art

Active matrix type liquid crystal display devices which use an active element represented by a thin film transistor (TFT) come in to widespread use as various display devices because of features that they are thin and light in weight and in view of high image quality. The display type of the liquid crystal display device is mainly classified into the following two types.

One of them is the type of displaying an image by interposing liquid crystal between two substrates each formed with transparent electrodes, operating the liquid crystal with voltage applied to the transparent electrodes, and modulating light having passed through the transparent electrodes and incident on a liquid crystal layer. Many products that are currently widespread adopt this vertical electric field type.

The other is the type which is referred to as a "horizontal electric field type" or "In-Plane Switching (IPS) type". A liquid crystal display panel of the IPS type displays an image by generating an electric field parallel to a substrate surface at least a portion between a pixel electrode and a counter electrode, driving liquid crystal with the electric field, and modulating light passing through a liquid crystal layer. This type has a feature that its view angle is remarkably wide. The feature of an active matrix type liquid crystal display device adopting the IPS type has been described in JP-T-5-505247, JP-B-63-21907, and JP-A-6-160878.

This kind of liquid crystal display device generates an electric field parallel to a substrate surface in order to drive liquid crystal between a color filter substrate and an active matrix substrate which are arranged so as to face to each other. Therefore, in order to stabilize the potential of a surface of the color filter substrate, a transparent conductive film such as of ITO is formed on the entire surface of the color filter substrate on a display surface side, a conductive tape or conductive paste is bonded to a part of the transparent conductive film at the periphery part of the color filter substrate on the display surface side, and a conductive frame is covered, thereby establishing an electrical connection (conduction). As a result, the conductive frame is grounded via another conductive frame or by conducting to a final product.

However, since the thus configured liquid crystal display device uses the conductive tape or conductive paste for the conduction between the conductive frame and the color filter substrate, the number of constituent members and the number of mounting steps (operations) therefor increase, resulting in a problem that the manufacturing cost is high.

SUMMARY OF THE INVENTION

Accordingly, the invention has been made to solve the above-described conventional problem, and it is an object of the invention to provide a liquid crystal display device which can reduce the manufacturing cost by reducing the number of parts and simplifying the fabrication and the assembling operation, for the conduction between a conductive frame and a color filter substrate.

In order to attain the object, a liquid crystal display device according to the invention includes: a liquid crystal display panel including a first substrate formed with a thin film transistor and a pixel electrode, a second substrate formed with a color filter, and a liquid crystal layer disposed between the first substrate and the second substrate; a panel frame housing the liquid crystal display panel; and a backlight supplying the liquid crystal display panel with light, in which the liquid crystal display panel has a conductive layer on a front surface of the second substrate, the panel frame has a side wall part extending along a side wall of the liquid crystal display panel and an upper surface part extending from the side wall part toward an image display area of the liquid crystal display panel, the upper surface part is in contact with the conductive layer of the liquid crystal display panel, and a constant potential is applied to the panel frame. Therefore, the potential of the second substrate is stabilized, making it possible to solve the problem in the related art.

DESCRIPTION OF THE PREFERRED EMBODIMENTS

Figure 1:
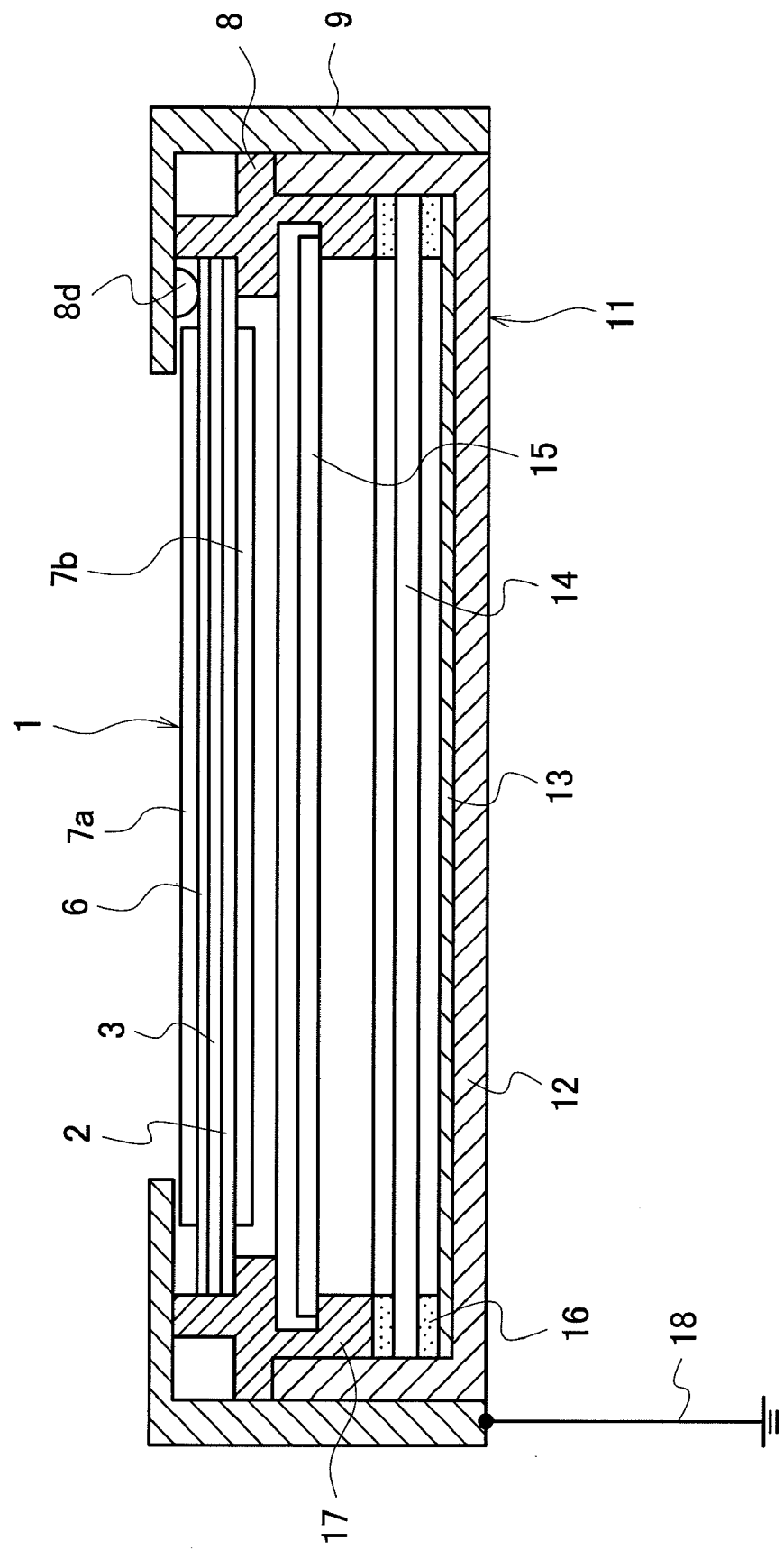
FIG. 1 is a principal part cross-sectional view showing a configuration example of Embodiment 1 of a liquid crystal display device according to the invention.

The gist of the invention has been described above. Hereinafter, a configuration of the invention will be described in detail.

A liquid crystal panel used in a display device of the invention includes a liquid crystal layer between a first substrate and a second substrate. The first substrate has a pixel electrode and a thin film transistor controlling the on and off of the pixel electrode. The second substrate has a color filter on a liquid crystal layer side thereof and a conductive layer on a front surface side thereof. The display device includes the liquid crystal display panel, a panel frame housing the liquid crystal display panel, and a backlight supplying the liquid crystal display panel with light. The panel frame has a side wall part extending along a side wall of the liquid crystal display panel and an upper surface part extending from the side wall part toward an image display area of the liquid crystal display panel, and the upper surface part is in contact with the conductive layer of the liquid crystal display panel. A constant potential is applied to the panel frame, whereby the potential of the second substrate is stabilized, making it possible to solve the problem described in the related art.

According to another liquid crystal display device of the invention, preferably, the conductive layer is an ITO film disposed on the second substrate in the above configuration.

According to still another liquid crystal display device of the invention, preferably, the conductive layer is a polarizer in the above configuration.

According to still another liquid crystal display device of the invention, preferably, the upper surface part of the panel frame covers a periphery part of the liquid crystal display panel from a front surface side and has a protruding part extending to the liquid crystal display panel in the above configuration.

According to still another liquid crystal display device of the invention, preferably, an edge part of the upper surface part of the panel frame is located closer to the liquid crystal display panel than a root part of the side wall part and the upper surface part is in the above configuration.

According to still another liquid crystal display device of the invention, preferably, the panel frame is a metal frame in the above configuration.

According to still another liquid crystal display device of the invention, preferably, the liquid crystal display panel is a liquid crystal display panel of a horizontal electric field type in the above configuration.

According to still another liquid crystal display device of the invention, preferably, the panel frame is formed to have a rectangular shape, and the upper surface part of the panel frame is formed with a slit at a corner part formed by one side of the rectangle and another side adjacent to the one side in the above configuration.

According to still another liquid crystal display device of the invention, preferably, the upper surface part of the panel frame covers a periphery part of the liquid crystal display panel from a front surface side and has a protruding part in contact with the liquid crystal display panel, and the protruding part is formed on the entire area of the one side in the above configuration.

The invention is not limited to the above configurations and can be variously modified without departing from the technical idea of the invention.

According to the invention, the panel frame can be brought into contact with the conductive layer of the liquid crystal display panel by combining the panel frame with the liquid crystal display panel, which eliminates the necessity of the conventional conductive tape or conductive paste. Therefore, the number of parts is reduced, and the fabrication and the assembling operation are no more required, resulting in an extremely excellent effect of, for example, reducing the manufacturing cost of a liquid crystal display device.

Further, according to the invention, a constant potential is applied to the panel frame, and thus, the potential of the second substrate is stabilized, which prevents the conductive layer on the second substrate from being charged with static electricity. Therefore, disturbance of a horizontal electric field is not generated, and a stable image display can be obtained, leading to an extremely excellent effect that a liquid crystal display device with high quality and reliability can be realized.

Hereinafter, specific embodiments of the invention will be described in detail with reference to the drawings thereof.

[Embodiment 1]

Figure 2:
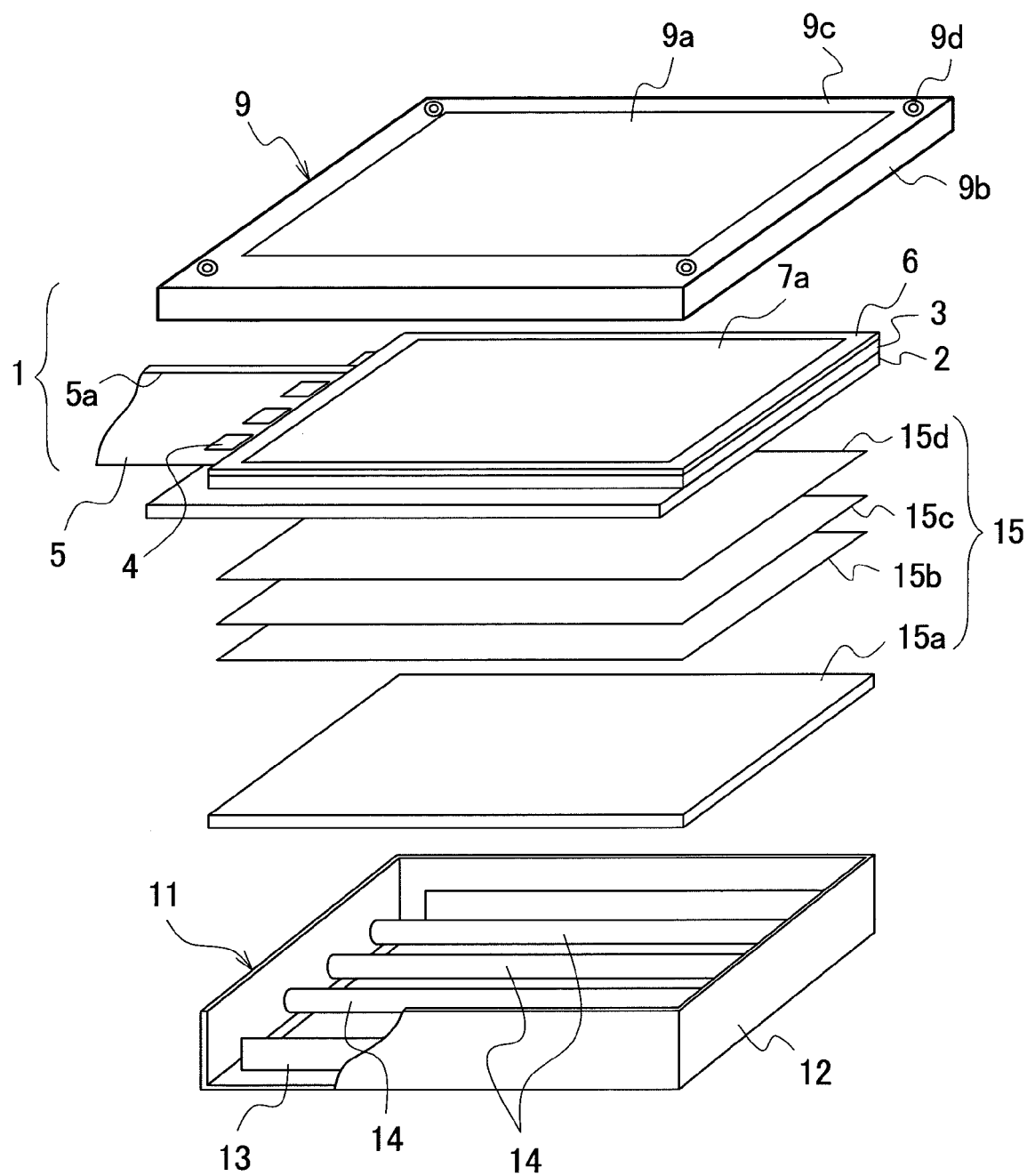
FIG. 2 is a development perspective view of the liquid crystal display device shown in FIG. 1.

FIG. 1 is a principal part schematic cross-sectional view for explaining a configuration of an embodiment of a liquid crystal display device according to the invention, while FIG. 2 is a principal part schematic development perspective view of FIG. 1.

In FIGS. 1 and 2, a liquid crystal display panel 1 of the horizontal electric field type has a liquid crystal layer sealed between two translucent glass substrates each having an electrode for forming pixel (not shown). One side of one glass substrate (generally referred to as an "active matrix substrate" or "thin film transistor substrate") 2 which is a first substrate formed with a thin film transistor, a pixel electrode, and the like extends off the other glass substrate (generally referred to as a "color filter substrate") 3 which is a second substrate formed with a color filter. An electrode terminal part is formed on the portion which extends off the glass substrate 3, and a flexible printed circuit board 5 on which chips 4 such as of a scanning signal line drive circuit and a data signal line drive circuit are mounted and having a grounding pattern 5a formed on a part thereof is connected to the electrode terminal part.

A translucent plastic substrate may be used for the first substrate 2 and the second substrate 3 instead of a glass substrate, or the combination of a glass substrate and a plastic substrate may be used.

On a front surface serving as an effective display area of the second glass substrate 3 constituting the liquid crystal display panel 1, a translucent conductive layer 6 made of, for example, an ITO (Indium-Tin-Oxide) film is deposited and formed, and further, an upper polarizer 7a is bonded to the surface of the conductive layer 6. In addition, a lower polarizer 7b is bonded to the back surface of the second glass substrate 3. The thus configured liquid crystal display panel 1 is housed in a frame-like mold frame 8 made of a molded article of a resin material so as to be fixedly supported thereby. Further, a frame-like metal panel frame 9 having a rectangular shape and having an opening 9a formed at a part facing to the image display area of the second glass substrate 3 covers the periphery part of the liquid crystal display panel 1 from the front surface side, and the liquid crystal display panel 1 is housed in the frame-like panel frame 9. In FIG. 2, the mold frame 8 is omitted.

Figure 3A:
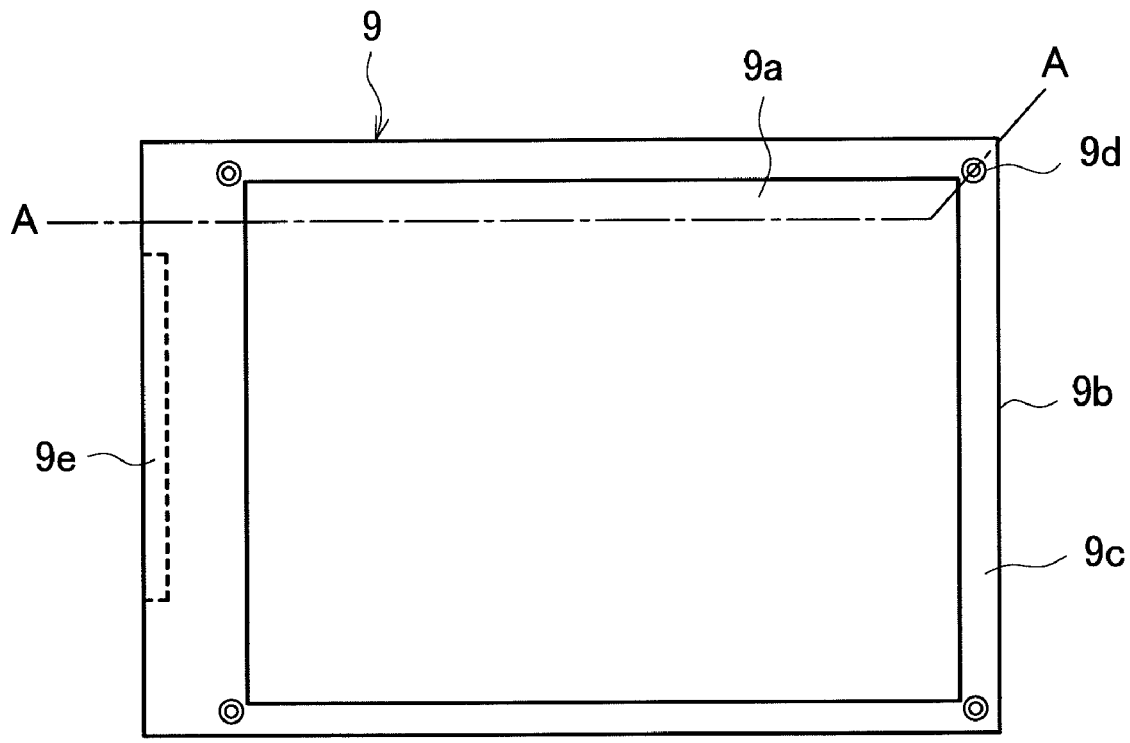
FIG. 3A is a principal part plan view as viewed from above, showing a configuration of a panel frame shown in FIGS. 1 and 2.
Figure 3B:
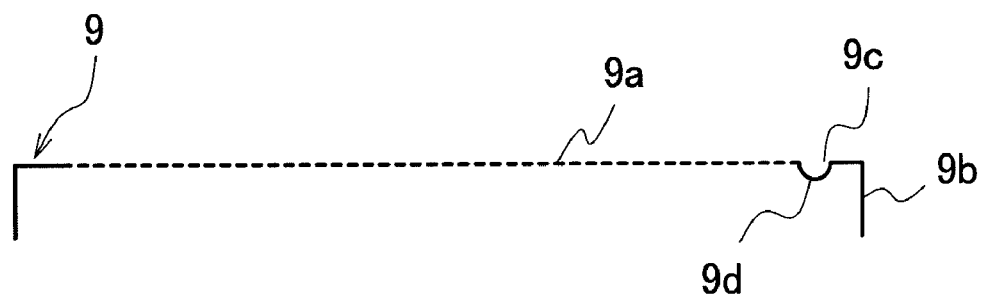
FIG. 3B is a principal part cross-sectional view taken along the line A-A in FIG. 3A.

FIGS. 3A and 3B are explanatory views of the configuration of the metal panel frame, in which FIG. 3A is a principal part plan view as viewed from above, while FIG. 3B is a principal part cross-sectional view taken along the line A-A in FIG. 3A. As shown in FIGS. 3A and 3B, the frame-like panel frame 9 has a side wall part 9b extending along the side wall of the liquid crystal display panel 1 and an upper surface part 9c extending from the side wall part 9b toward the image display area of the liquid crystal display panel 1, integrally joined together. For example, the frame-like panel frame 9 is formed by molding a nickel plate material into a substantially inverted L-shape in cross section by press molding. In the panel frame 9, an edge part of the upper surface part 9c is located closer to the liquid crystal display panel 1 than the root part of the side wall part 9b and the upper surface part 9c is. The panel frame 9 has functions of securing the mechanical strength of the liquid crystal display panel 1 and shielding backlight light.

Further, each of protruding parts 9d protruding toward a front surface side direction of the liquid crystal display panel 1 is formed at each corner part of the upper surface part 9c of the frame-like panel frame 9. The protruding part 9d is integrally formed by, for example, press molding. Accordingly, the liquid crystal display panel 1 is housed in the panel frame 9, whereby the tip of the protruding part 9d formed inside each corner part of the upper surface part 9c is brought into contact with the conductive layer 6 formed on the second glass substrate 3, providing direct conduction between the second glass substrate 3 and the panel frame 9. In the drawing, reference numeral 9e denotes an outlet port for leading the flexible printed circuit board 5 connected to the terminal part of the first glass substrate 2 to outside.

In FIGS. 1 and 2, in a box-shaped backlight 11 disposed on the back surface side of the liquid crystal display panel 1, a reflective sheet 13 is installed inside a backlight frame 12, and a plurality of cold cathode fluorescent lamps 14 are disposed in parallel above the reflective sheet 13. The backlight frame 12 is formed of a molded article of a resin material or metal plate and has a function of integrating the liquid crystal display panel 1 with an optical compensation sheet laminated body 15 by overlapping them between the backlight frame 12 and the panel frame 9.

The length of the cold cathode fluorescent lamp 14 generally increases in a tube axis direction as the size of the liquid crystal display panel 1 increases. The cold cathode fluorescent lamp 14 is a fluorescent lamp including a small-diameter glass tube, which is generally supported by, for example, rubber bushings 16 at both ends.

Further, in a liquid crystal display device using a direct type backlight as the backlight 11 as shown in the drawing, the optical compensation sheet laminated body 15 including plural kinds of sheets is disposed above the backlight 11 (between the backlight 11 and the liquid crystal display panel 1). The optical compensation sheet laminated body 15 includes a diffusing plate 15a, a first diffusing sheet 15b, two prism sheets 15c which are disposed so as to cross each other, and a second diffusing sheet 15d, laminated from the backlight frame 12 side in that order.

The above-described direct type backlight 11 has a frame-like side-part holding frame 17 made of a molded article of a resin material. The frame-like side-part holding frame 17 is disposed on a side periphery of the backlight frame 12 having a bottom and the side periphery and is referred to as a "side mold". The optical compensation sheet laminated body 15 is fixedly held by the side-part holding frame 17 with the periphery part being held thereby. In FIG. 2, the side-part holding frame 17 is omitted.

The backlight frame 12 in which the optical compensation sheet laminated body 15 is fixedly held as shown in the drawing is covered with the panel frame 9 combined with the liquid crystal display 1. The panel frame 9 and the backlight frame 12 are integrally joined together by a not-shown locking member or the like. A ground wire 18 is connected to a part of the panel frame 9.

In the thus configured liquid crystal display device, the conductive layer 6 formed on the front surface of the second glass substrate 3 is conducted to the panel frame 9 via the protruding part 9d. Therefore, the front surface of the second glass substrate 3 is not charged with static electricity, thereby making it possible to stabilize the potential of the second glass substrate 3 on the front surface side.

According to the configuration, means for conducting the second glass substrate 3 to the panel frame 9 does not require a member such as a conductive tape or conductive paste, and the fabrication and the assembling operation are simplified, thereby making it possible to reduce the cost.

Further, it is possible to stabilize the potential of the second glass substrate 3 on the front surface side also by connecting the panel frame 9 to the grounding pattern 5a formed on the flexible printed circuit board 5 via a conductive adhesive material such as a silver paste, for example.

When the backlight frame 12 is formed of a conductive member, the backlight frame 12 is conducted to the panel frame 9. Therefore, it is possible to stabilize the potential of the second glass substrate 3 on the front surface side by connecting the backlight frame 12 to a ground line.

[Embodiment 2]

Figure 4A:
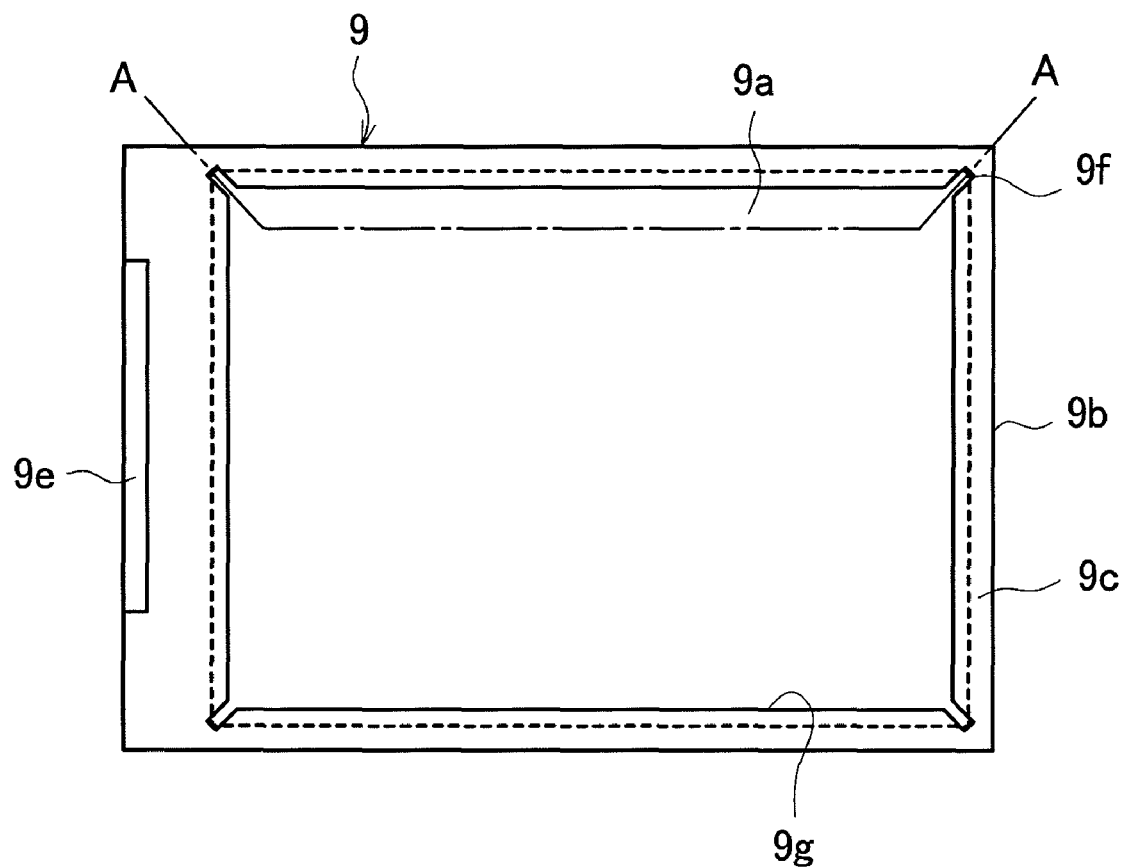
FIG. 4A is a principal part plan view as viewed from above, showing a configuration example of a panel frame of Embodiment 2 of the liquid crystal display device according to the invention.
Figure 4B:
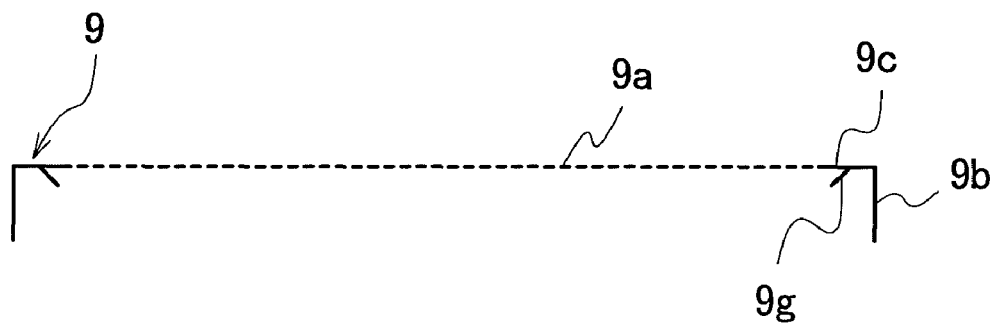
FIG. 4B is a principal part cross-sectional view taken along the line A-A in FIG. 4A.

FIGS. 4A and 4B are a principal part plan view and a cross-sectional view, respectively, of a panel frame for explaining another embodiment of the liquid crystal display device according to the invention, in which the same reference numerals are assigned to the same parts as those in the above-described drawings, and the explanations thereof will be omitted. FIGS. 4A and 4B differ from FIGS. 3A and 3B in that each of slit parts 9f extending in a screen center direction is formed on the upper surface part 9c of the panel frame 9 formed to have a rectangular shape at a corner part formed by one side of the rectangle and another side adjacent to the one side. Further, the panel frame of Embodiment 2 is formed with protruding parts 9g each covering the periphery part of the liquid crystal display panel 1 from the front surface side and drawn in a curved shape toward a front surface direction of the liquid crystal display panel 1. The protruding part 9g is formed on the entire area of the one side and conducted to the surface of the conductive layer 6 due to line contact.

According to the configuration, the liquid crystal display panel 1 is housed in the panel frame 9, whereby each of the protruding parts 9g formed at the inner periphery of the opening 9a is pressed against and linearly brought into contact with the conductive layer 6 formed on the second glass substrate 3 due to elastic force, providing direct conduction between the second glass substrate 3 and the panel frame 9. Accordingly, the conduction due to line contact, which is more reliable compared with the conduction due to point contact, can be provided, making it possible to realize a highly reliable conduction structure.

When a polarizer having conductivity is used as the upper polarizer 7a formed on the second glass substrate 3, the conductive layer 6 formed on the second glass substrate 3 is no more required. The protruding part 9d in Embodiment 1 or the protruding part 9g in Embodiment 2 of the panel frame 9 is directly brought into contact with the upper polarizer 7a, thereby making it possible to realize the conduction between the second glass substrate 3 and the panel frame 9.

What is claimed is:

1. A liquid crystal display device comprising:
   a liquid crystal display panel including a first substrate formed with a thin film transistor and a pixel electrode, a second substrate formed with a color filter, and a liquid crystal layer disposed between the first substrate and the second substrate;
   a panel frame housing the liquid crystal display panel; and
   a backlight supplying the liquid crystal display panel with light, wherein
   the liquid crystal display panel has a conductive layer on a front surface of the second substrate,
   the panel frame has a side wall part extending along a side wall of the liquid crystal display panel and an upper surface part extending from the side wall part toward an image display area of the liquid crystal display panel,
   the upper surface part is in contact with the conductive layer of the liquid crystal display panel, and
   a constant potential is applied to the panel frame,
   wherein the panel frame is formed to have a rectangular shape, and the upper surface part of the panel frame is formed with a slit at a corner part formed by one side of the rectangle and another side adjacent to the one side.

2. The liquid crystal display device according to claim 1, wherein the conductive layer is an ITO film disposed on the second substrate.

3. The liquid crystal display device according to claim 1, wherein the conductive layer is a polarizer.

4. The liquid crystal display device according to claim 1, wherein the upper surface part of the panel frame covers a periphery part of the liquid crystal display panel from a front surface side and has a protruding part extending to the liquid crystal display panel.

5. The liquid crystal display device according to claim 1, wherein an edge part of the upper surface part of the panel frame is located closer to the liquid crystal display panel than a root part of the side wall part.

6. The liquid crystal display device according to claim 1, wherein the panel frame is a metal frame.

7. The liquid crystal display device according to claim 1, wherein the liquid crystal display panel is a liquid crystal display panel of a horizontal electric field type.

8. The liquid crystal display device according to claim 1, wherein the upper surface part of the panel frame covers a periphery part of the liquid crystal display panel from a front surface side and has a protruding part in contact with the liquid crystal display panel, and the protruding part is formed on the entire area of the one side.

* * * * *